United States Patent
Yang et al.

(10) Patent No.: US 11,876,849 B2
(45) Date of Patent: Jan. 16, 2024

(54) MEDIA SERVICE PROCESSING METHOD AND ELECTRONIC DEVICE

(71) Applicant: Huawei Technologies Co., Ltd., Shenzhen (CN)

(72) Inventors: Rui Yang, Beijing (CN); Fenghui Dou, Beijing (CN); Hui Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/772,859

(22) PCT Filed: Aug. 7, 2020

(86) PCT No.: PCT/CN2020/107774
§ 371 (c)(1),
(2) Date: Apr. 28, 2022

(87) PCT Pub. No.: WO2021/082602
PCT Pub. Date: May 6, 2021

(65) Prior Publication Data
US 2022/0385713 A1    Dec. 1, 2022

(30) Foreign Application Priority Data
Oct. 29, 2019    (CN) .......................... 201911033969.8

(51) Int. Cl.
G06F 13/00    (2006.01)
H04L 65/613    (2022.01)
H04L 67/568    (2022.01)

(52) U.S. Cl.
CPC .......... *H04L 65/613* (2022.05); *H04L 67/568* (2022.05)

(58) Field of Classification Search
CPC ... H04L 65/613; H04L 67/568; H04L 65/612; H04L 65/80; H04L 65/75; H04N 21/23106; H04N 21/251; H04N 21/433; H04N 21/47202; H04N 21/222
USPC ........ 709/217–219, 213–216, 203, 231, 232, 709/235
See application file for complete search history.

(56) References Cited

U.S. PATENT DOCUMENTS

| | | | |
|---|---|---|---|
| 5,845,330 A * | 12/1998 | Sarkar | G06F 12/08 707/999.001 |
| 8,391,896 B2 * | 3/2013 | Curcio | H04L 1/0002 455/456.3 |
| 9,634,947 B2 * | 4/2017 | Krinsky | H04L 1/205 |

(Continued)

FOREIGN PATENT DOCUMENTS

| | | |
|---|---|---|
| CN | 105430475 A | 3/2016 |
| CN | 106878297 A | 6/2017 |

(Continued)

*Primary Examiner* — Kenneth R Coulter
(74) *Attorney, Agent, or Firm* — Conley Rose, P.C.

(57) ABSTRACT

A media service processing method, applied to an electronic device, includes providing, by an application running on the electronic device, a media service for a user, sending, to a server, request signaling requesting to send data of the media service to an intermediate storage unit, storing, in the intermediate storage unit, the data, moving the data from the intermediate storage unit to a target storage unit, wherein storage space of the intermediate storage unit is greater than storage space of the target storage unit, obtaining the data from the target storage unit, and playing the data.

20 Claims, 2 Drawing Sheets

(56) References Cited

U.S. PATENT DOCUMENTS

| | | |
|---|---|---|
| 2012/0009890 A1 | 1/2012 | Curcio et al. |
| 2017/0063704 A1 | 3/2017 | Krinsky |
| 2022/0124597 A1 | 4/2022 | Yang et al. |

FOREIGN PATENT DOCUMENTS

| | | |
|---|---|---|
| CN | 109600676 A | 4/2019 |
| CN | 109831689 A | 5/2019 |
| CN | 110072130 A | 7/2019 |
| WO | 2020168929 A1 | 8/2020 |

* cited by examiner

MEDIA SERVICE PROCESSING METHOD AND ELECTRONIC DEVICE

CROSS-REFERENCE TO RELATED APPLICATIONS

This is a U.S. National Stage of International Patent Application No. PCT/CN2020/107774 filed on Aug. 7, 2020, which claims priority to Chinese Patent Application No. 201911033969.8 filed on Oct. 29, 2019. Both of the aforementioned applications are hereby incorporated by reference in their entireties.

TECHNICAL FIELD

This application relates to the field of electronic devices, and more specifically, to a media service processing method and an electronic device.

BACKGROUND

In a process in which a user uses various audio/video applications (Application, app) installed on an electronic device, the user can usually obtain relatively good audio visual experience only in a good network environment.

However, not all network areas can provide a relatively good network environment for the electronic device. For example, on a fixed daily route of the user, a plurality of network areas usually provide network services for the user, and the plurality of network areas may include a network area with relatively good quality and a network area with relatively poor quality. When the user passes through the network area with relatively poor quality, the electronic device may be unable to properly use a network service. Consequently, play of a service on the electronic device freezes, and user experience is affected.

SUMMARY

This application provides a media service processing method, to reduce, in a scenario of weak network coverage, a possibility that play of an audio/video app freezes.

According to a first aspect, a media service processing method is provided. The method is applied to an electronic device, an application installed on the electronic device provides a media service for a user, the media service includes an audio service or a video service, and the method includes: sending request signaling to a server, where the request signaling requests the server to send data of the media service; storing, in an intermediate storage unit, the data that is of the media service and that comes from the server; and moving the data of the media service from the intermediate storage unit to a target storage unit, where storage space of the intermediate storage unit is greater than storage space of the target storage unit, and the target storage unit supports the application in obtaining the data of the media service from the target storage unit.

Based on the foregoing technical solution, the intermediate storage unit is allocated to the data that is of the media service and that comes from the server, and the storage space of the intermediate storage unit is made greater than the storage space of the target storage unit. Because a size of the storage space of the intermediate storage unit is greater than a size of the storage space of the target storage unit, longer-duration data of the media service can be buffered in the intermediate storage unit, and the data of the media service is moved from the intermediate storage unit to the target storage unit during play of the media service, so that when the electronic device is located in an area with weak network coverage, a play freezing possibility is reduced, thereby enhancing user experience.

In a possible implementation, the sending request signaling to a server includes: sending the request signaling to the server when it is determined that play of the media service is to freeze.

Based on the foregoing technical solution, when it is determined that play of the media service is to freeze, to avoid freezing, the electronic device sends the request signaling to the server, so that when the electronic device is located in an area with weak network coverage, a play freezing possibility is reduced, thereby enhancing user experience.

In a possible implementation, the method further includes: determining, based on a status of historical freezing of the application, that play of the media service is to freeze.

Based on the foregoing technical solution, when it is determined whether play of the media service is to freeze, it is determined, based on the status of the historical freezing of the application, whether play of the media service is to freeze, so that it can be more accurately determined whether play of the media service is to freeze. In addition, when it is determined that play of the media service is to freeze, to avoid freezing, the electronic device sends the request signaling to the server, so that when the electronic device is located in an area with weak network coverage, a play freezing possibility is reduced, thereby enhancing user experience.

In a possible implementation, the determining, based on a status of historical freezing of the application, that play of the media service is to freeze includes: determining, based on one or more of an occurrence moment of the historical freezing, a route on which the electronic device is located when the historical freezing occurs, and a network environment in which the electronic device is located when the historical freezing occurs, that play of the media service is to freeze.

In a possible implementation, the method further includes: allocating storage space to the intermediate storage unit based on duration of the historical freezing and/or the occurrence moment of the historical freezing.

Based on the foregoing technical solution, the storage space is allocated to the intermediate storage unit based on the duration of the historical freezing and/or the occurrence moment of the historical freezing, so that a size of the storage space of the intermediate storage unit allocated to the application can better meet a requirement of the user. For example, an intermediate storage unit with relatively large storage space is allocated to an application whose historical freezing lasts for relatively long duration, so that the electronic device buffers longer-duration buffer content for the application, and when the electronic device is located in an area with weak network coverage, a play freezing possibility is reduced, thereby enhancing user experience.

In a possible implementation, the method further includes: generating the request signaling based on historical request signaling of the application.

Based on the foregoing technical solution, an operating system program is enabled to learn the historical request signaling of the application, so that w % ben the electronic device determines that play of the application is to freeze, the application does not need to send request signaling to the server, but instead, the electronic device invokes the operating system program to send the request signaling to the server. In this way, when play of any application is to freeze, the electronic device can invoke the operating system program to send request signaling to the server. In other words, only the operating system program running on the electronic device needs to be improved, and the application installed on the electronic device does not need to be improved, so that complexity is reduced.

According to a second aspect, this technical solution provides a media service processing apparatus. The apparatus is included in an electronic device, and the apparatus has a function of implementing actions of the electronic device in the foregoing aspect and the possible implementations of the foregoing aspect. The function may be implemented by hardware, or may be implemented by hardware executing corresponding software. The hardware or the software includes one or more modules or units corresponding to the foregoing function.

According to a third aspect, this technical solution provides an electronic device, including a memory, a plurality of applications, and one or more computer programs. The one or more computer programs are stored in the memory, and the one or more computer programs include instructions. When the instructions are executed by the electronic device, the electronic device performs the following operations: sending request signaling to a server, where the request signaling requests the server to send data of a media service; storing, in an intermediate storage unit, the data that is of the media service and that comes from the server; and moving the data of the media service from the intermediate storage unit to a target storage unit, where storage space of the intermediate storage unit is greater than storage space of the target storage unit, and the target storage unit supports an application in obtaining the data of the media service from the target storage unit.

Based on the foregoing technical solution, the intermediate storage unit is allocated to the data that is of the media service and that comes from the server, and the storage space of the intermediate storage unit is made greater than the storage space of the target storage unit. Because a size of the storage space of the intermediate storage unit is greater than a size of the storage space of the target storage unit, longer-duration data of the media service can be buffered in the intermediate storage unit, and the data of the media service is moved from the intermediate storage unit to the target storage unit during play of the media service, so that w % ben the electronic device is located in an area with weak network coverage, a play freezing possibility is reduced, thereby enhancing user experience.

In a possible implementation, when sending the request signaling to the server, the electronic device is specifically configured to send the request signaling to the server when determining that play of the media service is to freeze.

Based on the foregoing technical solution, when it is determined that play of the media service is to freeze, to avoid freezing, the electronic device sends the request signaling to the server, so that when the electronic device is located in an area with weak network coverage, a play freezing possibility is reduced, thereby enhancing user experience.

In a possible implementation, the electronic device is further configured to determine, based on a status of historical freezing of the application, that play of the media service is to freeze.

Based on the foregoing technical solution, when it is determined whether play of the media service is to freeze, it is determined, based on the status of the historical freezing of the application, whether play of the media service is to freeze, so that it can be more accurately determined whether play of the media service is to freeze. In addition, when it is determined that play of the media service is to freeze, to avoid freezing, the electronic device sends the request signaling to the server, so that when the electronic device is located in an area with weak network coverage, a play freezing possibility is reduced, thereby enhancing user experience.

In a possible implementation, when determining, based on the status of the historical freezing of the application, that play of the media service is to freeze, the electronic device is specifically configured to determine, based on one or more of an occurrence moment of the historical freezing, a route on which the electronic device is located when the historical freezing occurs, and a network environment in which the electronic device is located when the historical freezing occurs, that play of the media service is to freeze.

In a possible implementation, the electronic device is further configured to allocate storage space to the intermediate storage unit based on duration of the historical freezing and/or the occurrence moment of the historical freezing.

Based on the foregoing technical solution, the storage space is allocated to the intermediate storage unit based on the duration of the historical freezing and/or the occurrence moment of the historical freezing, so that a size of the storage space of the intermediate storage unit allocated to the application can better meet a requirement of a user. For example, an intermediate storage unit with relatively large storage space is allocated to an application whose historical freezing lasts for relatively long duration, so that the electronic device buffers longer-duration buffer content for the application, and when the electronic device is located in an area with weak network coverage, a play freezing possibility is reduced, thereby enhancing user experience.

In a possible implementation, the electronic device is further configured to generate the request signaling based on historical request signaling of the application.

Based on the foregoing technical solution, an operating system program is enabled to learn the historical request signaling of the application, so that when the electronic device determines that play of the application is to freeze, the application does not need to send request signaling to the server, but instead, the electronic device invokes the operating system program to send the request signaling to the server. In this way, when play of any application is to freeze, the electronic device can invoke the operating system program to send request signaling to the server. In other words, only the operating system program running on the electronic device needs to be improved, and the application installed on the electronic device does not need to be improved, so that complexity is reduced.

According to a fourth aspect, this technical solution provides an electronic device, including one or more processors and one or more memories. The one or more memories are coupled to the one or more processors. The one or more memories are configured to store computer program code, the computer program code includes computer instructions, and when the one or more processors execute the computer instructions, the electronic device performs the media service processing method in any possible implementation of any one of the foregoing aspects.

According to a fifth aspect, this technical solution provides a computer storage medium, including computer instructions. When the computer instructions are run on an electronic device, the electronic device is enabled to perform the media service processing method according to any possible implementation of any one of the foregoing aspects.

According to a sixth aspect, this technical solution provides a computer program product. When the computer program product runs on an electronic device, the electronic device is enabled to perform the media service processing method according to any possible design of any one of the foregoing aspects.

DESCRIPTION OF EMBODIMENTS

The following describes the technical solutions of this application with reference to the accompanying drawings.

In a process in which a user uses various audio/video apps installed on an electronic device, the user can usually obtain relatively good audio visual experience only in a good network environment.

However, not all network areas can provide a relatively good network environment for the electronic device. For example, on a fixed daily route of the user, a plurality of network areas usually provide network services for the user, and the plurality of network areas may include a network area with relatively good quality and a network area with relatively poor quality. When the user passes through the network area with relatively poor quality, the electronic device may be unable to properly use a network service. Consequently, play of a service on the electronic device freezes, and user experience is affected.

In a known solution, a part of play content is buffered by using an internal buffer mechanism of an audio/video app, for example, for buffer duration of 200 seconds, so that a network problem is overcome and smooth play is implemented.

However, it is possible that play content buffered by the audio/video app is insufficient to support the electronic device in completely passing through an area with relatively poor network quality. For example, in a scenario in which a high-speed railway continuously passes through a tunnel, the high-speed railway is located in an area with weak network coverage m this scenario. It is assumed that duration for which the high-speed railway passes through the area with weak network coverage is 10 minutes. It can be learned that 200-second data that is of a media service and that is buffered by the audio/video app cannot support the high-speed railway in completely passing through the tunnel. Therefore, in the process in which the high-speed railway passes through the tunnel, play of the audio/video app may freeze, and therefore user experience is affected.

In view of this, embodiments of this application provide a media service processing method, to resolve a problem that play of an audio/video app freezes in a scenario of weak network coverage.

Figure 1:
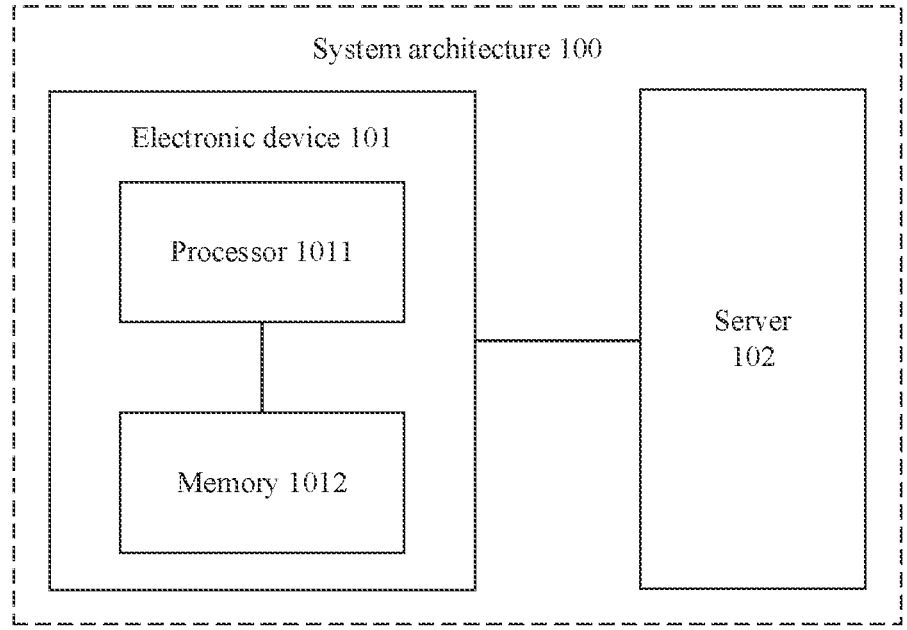
FIG. 1 is a schematic block diagram of a system architecture to which technical solutions provided in embodiments of this application are applied.

A system architecture 100 in embodiments of this application is first described with reference to FIG. 1. As shown in FIG. 1, the system architecture 100 includes an electronic device 101 and a server 102. The electronic device 101 includes a processor 1011 and a memory 1012. The memory 1012 stores an application, an operating system program, and data, the processor 1011 is configured to invoke the program and the data from the memory 1012 to process a related service, and the server 102 is configured to exchange information with the electronic device 101.

In this embodiment of this application, the electronic device 101 may further include a touchscreen and a display screen (not shown in FIG. 1). This is not specially limited in this embodiment of this application.

Figure 2:
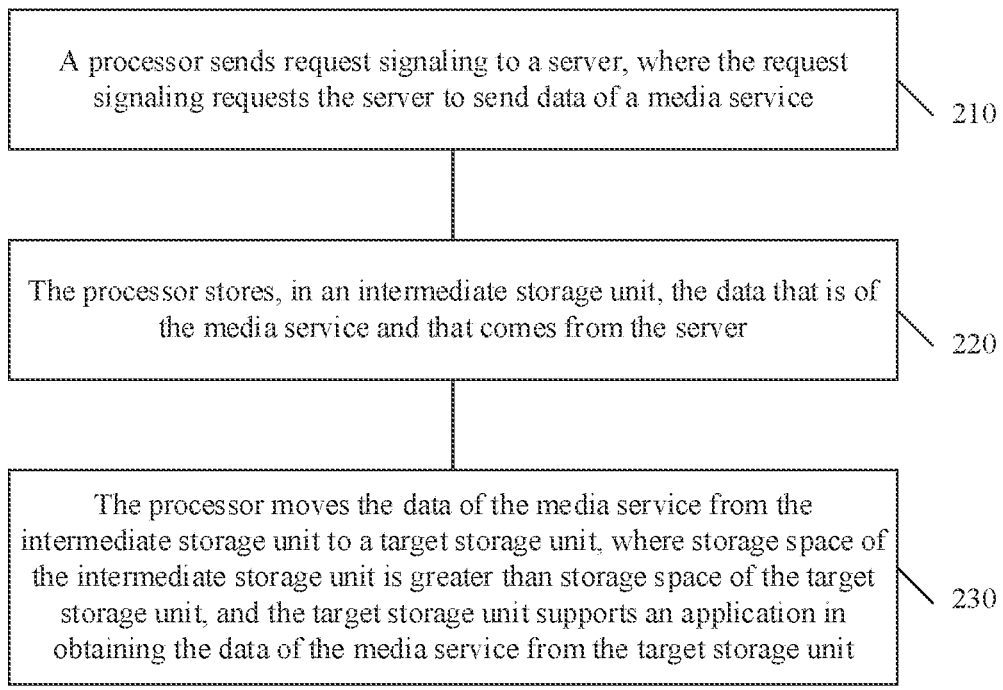
FIG. 2 is a schematic flowchart of a media service processing method 200 according to an embodiment of this application.

With reference to FIG. 2, the following describes in detail a media service processing method 200 provided in embodiments of this application. The method 200 is performed by an electronic device. An app installed on the electronic device can provide a media service for a user, and the media service includes an audio service or a video service.

Terms used in the following embodiments are merely intended to describe particular embodiments, but are not intended to limit this application. Terms "one", "a", "the", "the foregoing", "this", and "the one" of singular forms used in this specification and the appended claims of this application are also intended to include expressions such as "one or more", unless otherwise specified in the context clearly. It should be further understood that, in the following embodiments of this application, "at least one" or "one or more" means one, two, or more. The term "and/or" is used to describe an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects.

Reference to "an embodiment", "some embodiments", or the like described in this specification means that one or more embodiments of this application include a specific feature, structure, or characteristic described with reference to embodiments. Therefore, statements such as "in an embodiment". "in some embodiments", "in some other embodiments", and "in other embodiments" that appear at different places in this specification do not necessarily mean referring to a same embodiment, instead, they mean "one or more but not all of the embodiments", unless otherwise specifically emphasized. The terms "include", "contain", "have", and their variants all mean "include but are not limited to", unless otherwise specifically emphasized.

The electronic device in embodiments of this application may be a portable electronic device such as a mobile phone, a tablet computer, or a wearable electronic device (for example, a smartwatch) that has a wireless communication function. An example embodiment of the portable electronic device includes but is not limited to a portable electronic device provided with iOS®, Android®), Microsoft®, or another operating system.

An intermediate storage unit and a target storage unit in embodiments of this application are first described.

The target storage unit is buffer space allocated to an app installed on the electronic device, and is configured to buffer data of a media service related to the app. Generally, a size of storage space of a target storage unit allocated to each app in the electronic device is fixed and cannot be changed. For example, a part of storage space in the memory 1012 is used as a target storage unit allocated to a Huawei video app. The target storage unit can buffer 200-second data of a media service, and a size of the target storage unit cannot be changed.

In a scenario in which a high-speed railway continuously passes through a tunnel, the high-speed railway is located in an area with weak network coverage in this scenario. It is assumed that duration for which the high-speed railway passes through the area with weak network coverage is 10 minutes. It can be learned that the 200-second data that is of the media service and that is buffered by the Huawei video app cannot support the high-speed railway in completely passing through the tunnel. Therefore, in the process in which the high-speed railway passes through the tunnel, play of the Huawei video app may freeze, and therefore user experience is affected.

In view of this, embodiments of this application provide the intermediate storage unit. The intermediate storage unit is buffer space that is in the memory 1012, that is different from the target storage unit, and that is allocated to an app installed on the electronic device, and a size of storage space of the intermediate storage unit is greater than a size of storage space of the target storage unit. When receiving data of a media service from the server 102, the processor first stores the data of the media service in the intermediate storage unit, and then moves the data of the media service to the target storage unit, so that the app obtains the data of the media service from the target storage unit, and parses out play content corresponding to the data of the media service, to play the content for the user.

Because the size of the storage space of the intermediate storage unit is greater than the size of the storage space of the target storage unit, longer-duration data of a media service can be buffered in the intermediate storage unit, and the data of the media service is moved from the intermediate storage unit to the target storage unit during play of the media service, so that when the electronic device is located in an area with weak network coverage, a play freezing possibility is reduced, thereby enhancing user experience.

Step 210: The processor 1011 sends request signaling to the server 102, where the request signaling requests the server 102 to send data of a media service.

For example, an app currently running on the electronic device 101 is a video app (namely, an example of an app). When the electronic device 101 needs to buffer data of a video service (namely, an example of the data of the media service), the user can obtain smoother viewing experience. In this case, the processor 1011 may invoke and execute a sending unit in the operating system program stored in the memory 1012, to send request signaling to the server 102, so that the server 102 sends the data of the video service after receiving the request signaling.

Step 220: The processor 1011 stores, in an intermediate storage unit, the data that is of the media service and that comes from the server 102.

Step 230: The processor 1011 moves the data of the media service from the intermediate storage unit to a target storage unit, where storage space of the intermediate storage unit is greater than storage space of the target storage unit, and the target storage unit supports an application in obtaining the data of the media service from the target storage unit.

The processor 1011 invokes and executes a buffering unit in the operating system program stored in the memory 1012, and first stores, in an intermediate storage unit that is in the memory 1012 and that is allocated to the video app, the data that is of the video service and that comes from the server 102. Then, the processor 1011 invokes the buffering unit again to move the data of the video service from the intermediate storage unit to a target storage unit that is in the memory 1012 and that is allocated to the video app. The video app can access the target storage unit, obtain the data of the video service from the target storage unit, and parse the data of the video service to obtain video content corresponding to the data of the video service, to play the video content for the user.

In this embodiment of this application, the processor 1011 may send the request signaling to the server 102 when determining that play of the video service on the video app is to freeze. In this case, for example, the method 200 may further include the following step:

Before the processor 1011 sends the request signaling to the server 102, the processor 1011 may determine whether play of the video service is to freeze. When determining that play of the video service is to freeze, the processor 1011 invokes the sending unit to send the request signaling to the server 102.

For example, the processor 1011 may invoke and execute an exception sensing unit in the operating system program stored in the memory 1012, to determine whether play of the video service is to freeze. If the processor 1011 determines that play of the video service is to freeze, the processor 1011 may invoke and execute the exception sensing unit, to notify the sending unit that play of the video service is to freeze, so that the sending unit sends the request signaling to the server 102.

The processor 1011 may determine, in the following manner, whether play of the video service is to freeze:

For example, the processor 1011 determines, based on a status of historical freezing of the video app, whether play of the video service is to freeze.

Specifically, the processor 1011 may invoke and execute the exception sensing unit, so that the exception sensing unit determines, based on one or more of an occurrence moment of the historical freezing of the video app, a route on which the electronic device is located when the historical freezing occurs, and a network environment in which the electronic device is located when the historical freezing occurs, that play of the video service is to freeze.

For example, if at 11:06 a.m., (namely, an example of the occurrence moment of the historical freezing), play freezing previously occurred in the video app installed on the electronic device 101, a learning unit in the operating system program may notify the exception sensing unit of 11:06 a.m. When the exception sensing unit identifies that the video app is running on the electronic device 101 and a current moment approaches 11:06 a.m., the exception sensing unit may determine that play of the video service on the video app is to freeze. To avoid freezing, the exception sensing unit may notify the sending unit of this case, and the sending unit sends the request signaling to the server 102.

For example, if on a subway line (for example, a Beijing subway line 13) (namely, an example of the route on which the electronic device 101 is located when the historical freezing occurs), play freezing previously occurred in the video app installed on the electronic device 101, the learning unit may notify the exception sensing unit of the Beijing subway line 13. When the exception sensing unit identifies that the video app is running on the electronic device 101 and the electronic device 101 is located on the Beijing subway line 13, the exception sensing unit may determine that play of the video service on the video app is to freeze. To avoid freezing, the exception sensing unit may notify the sending unit of this case, and the sending unit sends the request signaling to the server 102.

For example, if on the Beijing subway line 13 (namely, an example of the route on which the electronic device 101 is located when the historical freezing occurs) at 21:10 p.m. (namely, an example of the occurrence moment of the historical freezing), play freezing previously occurred in the video app installed on the electronic device 101, the learning unit may notify the exception sensing unit of 21:10 p.m. and the Beijing subway line 13. When the exception sensing unit identifies that the video app is running on the electronic device 101 on the Beijing subway line 13 and a current moment approaches 21:10 p.m., the exception sensing unit may determine that play of the video service on the video app is to freeze. To avoid freezing, the exception sensing unit may notify the sending unit of this case, and the sending unit sends the request signaling to the server 102.

For example, the processor 1011 may notify the exception sensing unit of the network environment in which the electronic device 101 is located when the historical freezing of the video app occurs. For example, the learning unit may notify the exception sensing unit of signal strength (namely, an example of the network environment in which the electronic device 101 is located) of a cell in which the electronic device 101 is located when the historical freezing of the video app occurs. When the exception sensing unit identifies that the video app is running on the electronic device 101 and a network environment in which the electronic device 101 is located at a current moment is similar to the network environment in which the electronic device 101 is located when the historical freezing of the video app occurs, for example, the exception sensing unit determines that signal strength (namely, an example of the network environment in which the electronic device 101 is located at the current moment) of a cell in which the electronic device 101 is located at the current moment is less than or equal to the signal strength of the cell in which the electronic device 101 is located when the historical freezing of the video app occurs, the exception sensing unit may determine that play of the video service on the video app is to freeze. To avoid freezing, the exception sensing unit may notify the sending unit of this case, and the sending unit sends the request signaling to the server 102.

For example, the learning unit may notify the exception sensing unit of a delay and/or a throughput of transmitting the data of the video service to the electronic device 101 by the server 102 when the historical freezing of the video app occurs. When the exception sensing unit identifies that the video app is running on the electronic device 101 and a delay and/or a throughput of transmitting the data of the video service to the electronic device 101 by the server 102 at a current moment are or is close to a delay and/or a throughput of transmitting the data of the video service to the electronic device 101 by the server 102 when the historical freezing of the video app occurs, for example, the delay and/or the throughput of transmitting the data of the video service to the electronic device 101 by the server 102 at the current moment are or is less than or equal to the delay and/or the throughput of transmitting the data of the video service to the electronic device 101 by the server 102 when the historical freezing of the video app occurs, the exception sensing unit may determine that play of the video service on the video app is to freeze. To avoid freezing, the exception sensing unit may notify the sending unit of this case, and the sending unit sends the request signaling to the server 102.

In addition, the processor may further determine, based on a preset condition, whether play of the video service is to freeze. For example, the preset condition is the Beijing subway line 13. In this case, when identifying that the video app is running on the electronic device 101 on the Beijing subway line 13, the exception sensing unit may determine that play of the video service is to freeze. In this case, to avoid freezing, the exception sensing unit may notify the sending unit of this case, and the sending unit sends the request signaling to the server 102.

It should be noted that the foregoing method for determining, based on the status of the historical freezing of the video app, whether play of the video service is to freeze is merely used as an example for description, and does not constitute a limitation on this application. All other methods for determining, based on the status of the historical freezing of the video app, whether play of the video service is to freeze fall within the protection scope of this application.

In this embodiment of this application, the processor 1011 may allocate storage space of the intermediate storage unit to the video app based on duration of the historical freezing of the video app and/or the occurrence moment of the historical freezing.

For example, the learning unit may allocate, based on duration of historical freezing of video apps, an intermediate storage unit with relatively large storage space to a video app whose historical freezing lasts for relatively long duration, and allocate an intermediate storage unit with relatively small storage space to a video app whose historical freezing lasts for relatively short duration.

For example, when the duration of the historical freezing of the video app is 100 seconds, the learning unit may allocate an intermediate storage unit whose size is 1000 gigabytes (Gbyte) to the video app; or when the duration of the historical freezing of the video app is 200 seconds, the learning unit may allocate an intermediate storage unit whose size is 2000 Gbytes to the video app.

In addition, the processor 1011 may alternatively allocate the storage space to the intermediate storage unit of the video app based on the duration of the historical freezing and the occurrence moment of the historical freezing.

For example, because a probability of watching a video by the user on a workday is less than that on a holiday, when the occurrence moment of the historical freezing of the video app is in a workday and the duration of the historical freezing is dozens of seconds, the learning unit may allocate an intermediate storage unit with relatively small storage space to the video app: or when the occurrence moment of the historical freezing of the video app is in a holiday and the duration of the historical freezing is close to duration of historical freezing on the workday, the learning unit may allocate an intermediate storage unit with relatively large storage space to the video app.

In addition, the processor 1011 may alternatively allocate the storage space of the intermediate storage unit to the video app based on the occurrence moment of the historical freezing.

For example, because a probability of watching a video by the user during working hours is less than that during eating time, when the occurrence moment of the historical freezing of the video app falls within the working hours, the learning unit may allocate an intermediate storage unit with relatively small storage space to the video app; or when the occurrence moment of the historical freezing of the video app falls within the eating time, the learning unit may allocate an intermediate storage unit with relatively large storage space to the video app.

In this embodiment of this application, to enable the processor 1011 to invoke and execute, when determining that the video app is to freeze, the operating system program to send the request signaling to the server 102, the learning unit in the operating system program may learn a format of historical request signaling sent by the video app to the server 102, to generate the request signaling in this embodiment of this application.

For example, the learning unit may learn a format of hypertext transfer protocol (Hyper Text Transfer Protocol, HTTP) request signaling (namely, an example of the historical request signaling) sent by the video app to the server 102, to generate the request signaling in this embodiment of this application.

In this embodiment of this application, the format of the historical request signaling sent by the video app to the server 102 may be learned through online learning. For example, the format of the historical request signaling sent by the video app to the server 102 may be learned by the learning unit in the operating system program. In addition, in this embodiment of this application, the format of the historical request signaling sent by the video app to the server 102 may be alternatively learned through offline learning. For example, the format of the historical request signaling sent by the video app to the server 102 may be learned by using a third-party platform, and the third-party platform sends the learned format of the historical request signaling to the electronic device 101, so that when determining that play of the video app is to freeze, the electronic device 101 can invoke and execute the sending unit in the operating system program, and the sending unit sends the request signaling to the server 102 based on the format of the historical request signaling.

It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

It may be understood that, to implement the foregoing functions, the electronic device includes corresponding hardware and/or software modules for performing the functions.

With reference to algorithm steps of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the electronic device may be divided into function modules based on the foregoing method examples. For example, each function module corresponding to each function may be obtained through division, or two or more functions may be integrated into one processing module. The integrated module may be implemented in a form of hardware. It should be noted that, in the embodiments, division into modules is an example, and is merely logical function division. During actual implementation, there may be another division manner.

Figure 3:
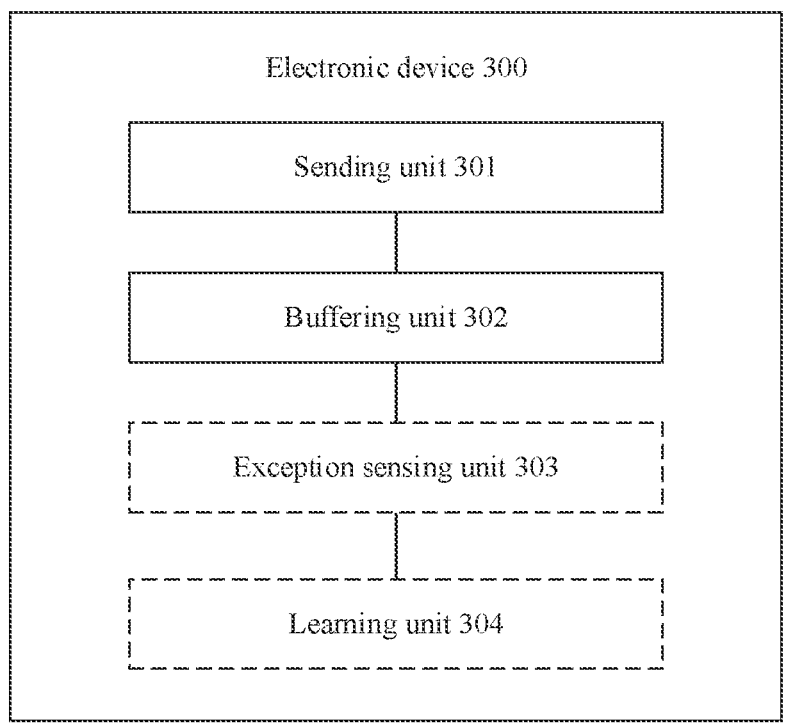
FIG. 3 is a schematic block diagram of an electronic device according to an embodiment of this application.

When each function module is obtained through division for each function, FIG. 3 is a possible schematic diagram of composition of an electronic device 300 in the foregoing embodiment. As shown in FIG. 3, the electronic device 300 may include a sending unit 301 and a buffering unit 302.

The sending unit 301 is configured to send request signaling to a server. The request signaling requests the server to send data of a media service.

The buffering unit 302 is configured to store, in an intermediate storage unit, the data that is of the media service and that comes from the server.

The buffering unit 302 is further configured to move the data of the media service from the intermediate storage unit to a target storage unit. Storage space of the intermediate storage unit is greater than storage space of the target storage unit, and the target storage unit supports an application in obtaining the data of the media service from the target storage unit.

Optionally, when sending the request signaling to the server, the sending unit 301 is specifically configured to send the request signaling to the server when it is determined that play of the media service is to freeze.

Optionally, the electronic device 300 further includes an exception sensing unit 303, configured to determine, based on a status of historical freezing of the application, that play of the media service is to freeze.

Optionally, when determining, based on the status of the historical freezing of the application, that play of the media service is to freeze, the exception sensing unit 303 is specifically configured to determine, based on one or more of an occurrence moment of the historical freezing, a route on which the electronic device is located when the historical freezing occurs, and a network environment in which the electronic device is located when the historical freezing occurs, that play of the media service is to freeze.

Optionally, the electronic device 300 further includes a learning unit 304, configured to allocate storage space to the intermediate storage unit based on duration of the historical freezing and/or the occurrence moment of the historical freezing.

Optionally, the learning unit 304 is further configured to generate the request signaling based on historical request signaling of the application.

It should be noted that all related content of the steps in the foregoing method embodiments may be cited in function descriptions of corresponding function modules. Details are not described herein again.

The electronic device provided in this embodiment is configured to perform the foregoing media service processing method, and therefore can achieve a same effect as the foregoing implementation method.

When an integrated unit is used, the electronic device may include a processing module, a storage module, and a communications module. The processing module may be configured to control and manage an action of the electronic device. For example, the processing module may be configured to support the electronic device in performing steps performed by the buffering unit 302, the exception sensing unit 303, and the learning unit 304. The storage module may be configured to support the electronic device to store program code, data, and the like. The communications module may be configured to support communication between the electronic device and another device.

The processing module may be a processor or a controller. The processing module may implement or execute various example logical blocks, modules, and circuits described with reference to content disclosed in this application. The processor may alternatively be a combination, for example, a combination including one or more microprocessors or a combination of digital signal processing (digital signal processing, DSP) and a microprocessor, for implementing a computing function. The storage module may be a memory. The communications module may be specifically a device that interacts with another electronic device, such as a radio frequency circuit, a Bluetooth chip, or a Wi-Fi chip.

In an embodiment, when the processing module is a processor and the storage module is a memory, the electronic device in this embodiment may be an electronic device that is of the structure shown in FIG. 1.

An embodiment further provides a computer storage medium. The computer storage medium stores computer instructions, and when the computer instructions run on an electronic device, the electronic device performs the foregoing related method steps to implement the media service processing method in the foregoing embodiment.

An embodiment further provides a computer program product. When the computer program product runs on a computer, the computer performs the foregoing related steps to implement the media service processing method in the foregoing embodiment.

In addition, an embodiment of this application further provides an apparatus. The apparatus may be specifically a chip, a component, or a module. The apparatus may include a processor and a memory that are connected. The memory is configured to store computer executable instructions, and when the apparatus runs, the processor may execute the computer executable instructions stored in the memory, so that the chip performs the media service processing method in the foregoing method embodiments.

The electronic device, the computer storage medium, the computer program product, and the chip provided in the embodiments are all configured to perform a corresponding method provided above. Therefore, for beneficial effects that can be achieved by the electronic device, the computer storage medium, the computer program product, and the chip, refer to beneficial effects of the corresponding method provided above. Details are not described herein again.

Based on the foregoing description of the implementations, a person skilled in the art may understand that for the purpose of convenient and brief description, division into the foregoing function modules is merely used as an example for description. In an actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatuses and methods may be implemented in other manners. For example, the apparatus embodiment described above is merely an example. For example, division into the modules or units is merely logical function division. There may be another division manner during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, in other words, may be located at one place, or may be distributed on different places. A part or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for media service processing applied to an electronic device, wherein the method comprises:
providing, using an application installed and running on the electronic device, a media service for a user;
sending, to a server, request signaling requesting to send data of the media service from the server to an intermediate storage unit on the electronic device, wherein the intermediate storage unit is a first buffer space in a memory of the electronic device and that is allocated to the application installed on the electronic device;
storing, in the intermediate storage unit, the data;
moving the data from the intermediate storage unit to a target storage unit of the electronic device, wherein the target storage unit is a second buffer space allocated to the application installed on the electronic device, and wherein a first storage space of the intermediate storage unit on the electronic device is greater than a second storage space of the target storage unit on the same electronic device;
obtaining the data from the target storage unit; and
playing the data.

2. The method of claim 1, wherein sending the request signaling comprises:
making a determination that play of the media service is to freeze; and
sending, in response to the determination, the request signaling.

3. The method of claim 2, further comprising determining, based on a status of historical freezing of the application, that the play is to freeze.

4. The method of claim 3, further comprising determining that the play is to freeze based on an occurrence moment of the historical freezing, a route on which the electronic device is located when the historical freezing occurs, or a network environment in which the electronic device is located when the historical freezing occurs.

5. The method of claim 3, further comprising allocating the first storage space to the intermediate storage unit based on a duration of the historical freezing and/or an occurrence moment of the historical freezing.

6. The method of claim 1, further comprising generating the request signaling based on historical request signaling of the application.

7. An electronic device comprising:
an application installed on the electronic device;
an intermediate storage unit on the electronic device, wherein the intermediate storage unit is a first buffer space in a memory of the electronic device and that is allocated to the application installed on the electronic device;
a target storage unit, wherein the target storage unit is a second buffer space allocated to the application installed on the electronic device; and
a processor coupled to the intermediate storage unit and the target storage unit and configured to:
provide, using the application, a media service for a user;
send, to a server, request signaling requesting to send data of the media service from the server to the intermediate storage unit on the electronic device;
store, in the intermediate storage unit, the data;
move the data from the intermediate storage unit to the target storage unit, wherein a first storage space of the intermediate storage unit on the electronic device is greater than a second storage space of the target storage unit on the electronic device;
obtain the data from the target storage unit; and
play the data.

8. The electronic device of claim 7, wherein the processor is further configured to:
make a determination that play of the media service is to freeze; and
send, in response to the determination, the request signaling.

9. The electronic device of claim 8, wherein the processor is further configured to determine, based on a status of a historical freezing of the application, that the play is to freeze.

10. The electronic device of claim 9, wherein the processor is further configured to determine that the play is to freeze based on an occurrence moment of the historical freezing, a route on which the electronic device is located when the historical freezing occurs, or a network environment in which the electronic device is located when the historical freezing occurs.

11. The electronic device of claim 9, wherein the processor is further configured to allocate the first storage space to the intermediate storage unit based on a duration of the historical freezing and/or an occurrence moment of the historical freezing.

12. The electronic device of claim 9, wherein the processor is further configured to determine size of the intermediate storage unit based on a duration of the historical freezing and/or an occurrence moment of the historical freezing.

13. The electronic device of claim 7, wherein the processor is further configured to generate the request signaling based on historical request signaling of the application.

14. An electronic device comprising:
an application installed on the electronic device;
an intermediate storage unit on the electronic device, wherein the intermediate storage unit is a first buffer space in a memory of the electronic device and that is allocated to the application installed on the electronic device;
a target storage unit, wherein the target storage unit is a second buffer space allocated to the application installed on the electronic device; and
a processor coupled to the intermediate storage unit and the target storage unit and configured to:
play a video, through a network of the electronic device, using the application;
allocate the intermediate storage unit to the first application when a first condition is satisfied;
send, to a server, request signaling requesting to send data related to the video from the server to the intermediate storage unit on the electronic device;
store, in the intermediate storage unit, the data from the server;
move the data from the intermediate storage unit on the electronic device to the target storage unit on the electronic device, wherein the target storage unit supports the application;
obtain the data from the target storage unit; and
play the data.

15. The electronic device of claim 14, wherein storage space of the intermediate storage unit is greater than storage space of the target storage unit.

16. The electronic device of claim 14, wherein the first condition indicates that the playing of the video is to freeze.

17. The electronic device of claim 14, wherein the first condition relates to a historical freezing behavior of the electronic device.

18. The electronic device of claim 17, wherein the historical freezing behavior includes moment and/or location when a historical freezing occurred.

19. The electronic device of claim 14, wherein the processor is further configured to determine a size of the intermediate storage unit based on a duration of a historical freezing and/or an occurrence moment of the historical freezing.

20. The electronic device of claim 14, wherein the processor is further configured to generate the request signaling based on historical request event of the electronic device.

* * * * *